(12) United States Patent
Taubmann et al.

(10) Patent No.: US 7,143,513 B2
(45) Date of Patent: Dec. 5, 2006

(54) METHOD OF FORMING A HOUSING FOR GEAR ELEMENTS

(75) Inventors: Werner Taubmann, Lautertal (DE); Alwin Macht, Ebensfeld (DE); Bernhard Schrimpl, Coburg (DE); Matthias Liebetrau, Coburg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 10/980,971

(22) Filed: Nov. 3, 2004

(65) Prior Publication Data

US 2005/0082890 A1 Apr. 21, 2005

Related U.S. Application Data

(63) Continuation of application No. 09/647,899, filed as application No. PCT/DE99/01082 on Apr. 6, 1999, now Pat. No. 7,051,986.

(30) Foreign Application Priority Data

Apr. 6, 1998 (DE) ................. 198 15 283

(51) Int. Cl.
*B21K 1/26* (2006.01)
(52) U.S. Cl. ............... 29/893.1; 248/429; 74/89.14; 29/428
(58) Field of Classification Search .......... 248/429, 248/422, 419, 424; 74/89.14, 89.28, 606 R; 29/893.1, 428; 49/506
See application file for complete search history.

(56) References Cited

U.S. PATENT DOCUMENTS

| | | |
|---|---|---|
| 3,184,209 A | 5/1965 | Colautti |
| 4,245,687 A | 1/1981 | Vecchiarelli |
| 4,404,632 A | 9/1983 | Harada et al. |
| 4,498,424 A | 2/1985 | Leuschner |
| 4,616,525 A | 10/1986 | Ueberschar |
| 4,788,885 A | 12/1988 | Fries |
| 4,790,202 A | 12/1988 | Hayashi et al. |
| 4,802,374 A | 2/1989 | Hamelin et al. |
| 5,034,870 A | 7/1991 | Weber |

(Continued)

FOREIGN PATENT DOCUMENTS

DE 17 55 740 1/1972

(Continued)

OTHER PUBLICATIONS

Exhibit A—Photograph of BMW Z3, pp. 1-14.

(Continued)

*Primary Examiner*—Gregory J. Strimbu
(74) *Attorney, Agent, or Firm*—Christie, Parker & Hale, LLP.

(57) ABSTRACT

A drive for adjusting devices includes gear elements mounted in a gear housing which includes at least two plates that can be secured to each other by plug connectors. The connectors are also configured as supporting joints that absorb the forces of the gear elements. A method for assembling the gear housing includes prefitting the gear elements and the housing plates by fitting the housing plates together about the gear elements with plug connectors, holding the housing plates with a holding device with sufficiently light holding forces so that the housing plates can be aligned when the gear elements are turned, turning the gear elements for the purpose of aligning bearing points of the gear elements, and securing the position of the gear elements and the housing plates relative to each other by permanently fixing the position of the housing plates in all three-dimensional directions through action on the plug connectors.

6 Claims, 13 Drawing Sheets

U.S. PATENT DOCUMENTS

| | | |
|---|---|---|
| 5,094,420 A | 3/1992 | Aihara et al. |
| 5,150,872 A | 9/1992 | Isomura |
| 5,197,780 A | 3/1993 | Coughlin |
| 5,259,257 A | 11/1993 | Mouri |
| 5,267,717 A | 12/1993 | Isomura |
| 5,273,242 A | 12/1993 | Mouri et al. |
| 5,292,164 A | 3/1994 | Rees |
| 5,314,158 A | 5/1994 | Mouri |
| 5,342,013 A | 8/1994 | Ito et al. |
| 5,349,878 A | 9/1994 | White et al. |
| 5,429,011 A | 7/1995 | Stevenson |
| 5,487,520 A | 1/1996 | Mouri et al. |
| 5,516,071 A | 5/1996 | Miyauchi |
| 5,662,545 A * | 9/1997 | Zimmerman et al. ....... 475/344 |
| 5,768,942 A | 6/1998 | Gruber et al. |
| 5,810,315 A | 9/1998 | Dinkel et al. |
| 5,816,555 A | 10/1998 | Ito et al. |
| 5,929,164 A | 7/1999 | Zhang |
| 6,032,550 A | 3/2000 | Rugh |

FOREIGN PATENT DOCUMENTS

| | | |
|---|---|---|
| DE | 30 07 102 | 12/1980 |
| DE | 35 08 249 A1 | 9/1986 |
| DE | 39 22 316 A1 | 1/1990 |
| DE | 40 21 669 | 2/1992 |
| DE | 41 01 470 C1 | 6/1992 |
| DE | 41 30 079 C2 | 3/1993 |
| DE | 43 24 913 | 11/1994 |
| EP | 0 193 794 B1 | 9/1986 |
| EP | 359 008 | 3/1990 |
| WO | WO 86/06036 | 10/1986 |

OTHER PUBLICATIONS

Exhibit B—Photograph of BMW E31.
Exhibit C—Network Information—The different models of the 8-Series E31 (8 pages) +.
Internet Information—Carsoft USA (5 pages).

* cited by examiner

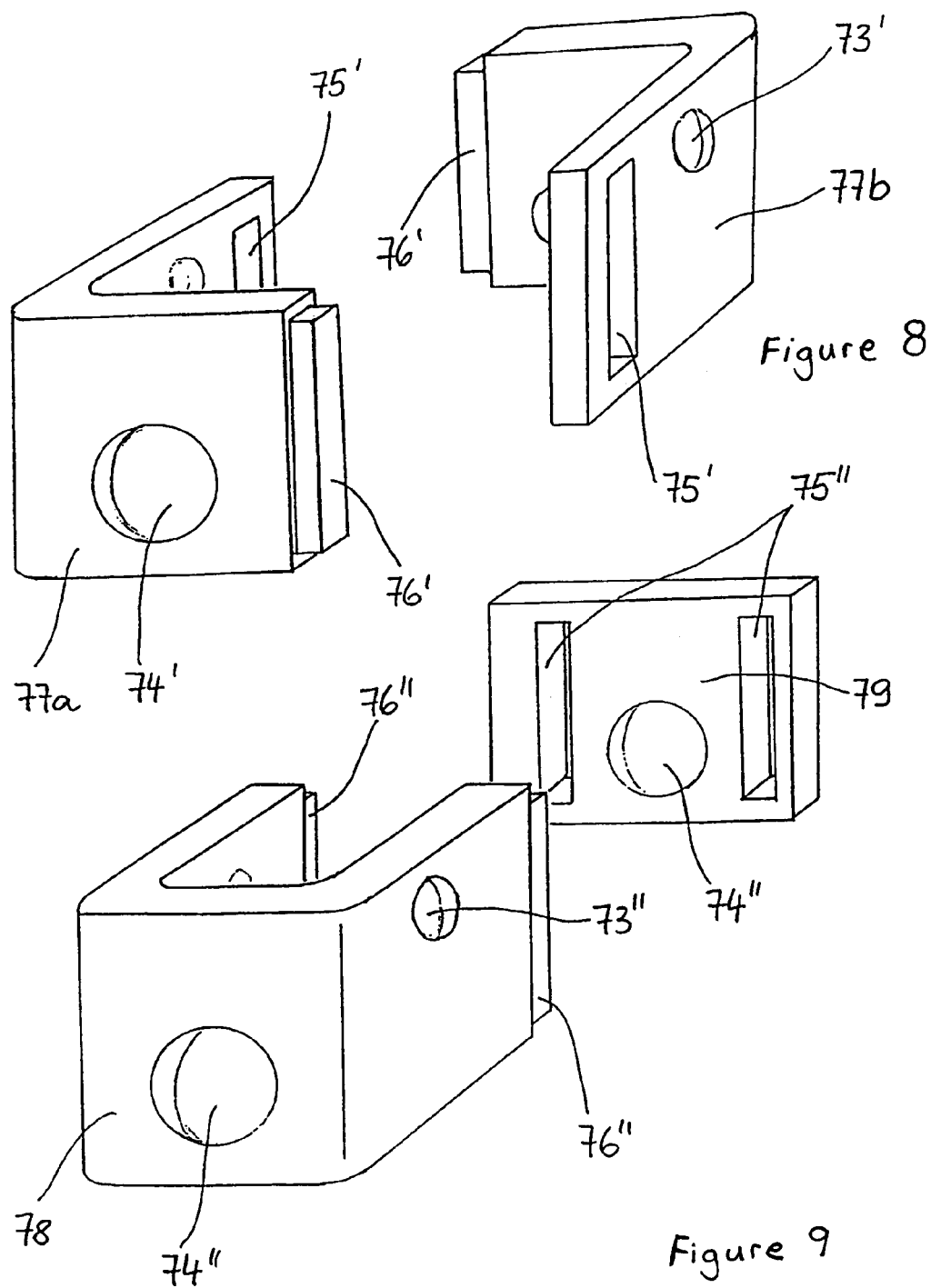

METHOD OF FORMING A HOUSING FOR GEAR ELEMENTS

CROSS-REFERENCE TO RELATED APPLICATION(S)

This application is a continuation of U.S. patent application Ser. No. 09/647,899 filed Dec. 21, 2000 now U.S. Pat. No. 7,051,986, which is a national stage of PCT/DE99/01082 filed Apr. 6, 1999, the disclosures of which are incorporated fully herein by reference.

BACKGROUND OF THE INVENTION

The invention relates to a spindle or worm drive for adjusting devices in motor vehicles.

From DE OS 17 55 740 a spindle drive is known for an adjusting device on a motor vehicle seat. The vehicle seat is here fixed on two parallel slide rails which run on guide rails mounted on the vehicle floor. One threaded spindle is mounted parallel to each slide rail and is connected rotationally locked to same.

Next to the locally fixed guide rails and fixedly connected to same is a gearing block which holds a spindle nut mounted on the threaded spindle, as well as a drive worm which meshes with the nut. The drive worms of each gearing block are connected to a common drive motor. The gearing block consists of two parts which are screwed together.

If the drive motor is actuated then the spindle nuts are turned through the drive worms. Since the threaded spindle is mounted rotationally secured the threaded spindle and the vehicle seat connected to same are moved relative to the gearing block and thus to the vehicle floor.

The drawback with this solution is that the gearing block is expensive to manufacture. The gearing block itself is too large so that it cannot for example be mounted inside the rails.

From DE 40 21 669 A1 a housing is known for an electric auxiliary drive which has two half shells which are held together by means of elastic detent elements.

From DE 43 24 913 C1 a housing is known for an electric servo drive which consists of a housing shell and a housing cover which on one side are connected together by elastic snap-fit elements and which on the other side are supported against each other through additional supporting areas.

From DE 30 07 102 a device is known for changing the incline of the slats of a slatted blind, and has a rotatable drive shaft, a worm mounted on the drive shaft; a rotatable worm wheel engaging with the worm; an integral housing with two mirror-symmetrical shaped housing parts; a fixed articulated joint which connects the housing parts together so that they can be moved between an opening and a closing position; two bearing parts on each housing part which form a bearing for the drive shaft and the worm, as well as a bearing each as a support bearing for the worm wheel in the closed position of the housing parts; and a device which fixes the housing position secure in its closed position. This device comprises an L-shaped fastening yoke which is connected to the two housing parts by means of a locking bolt and two plug-type connectors. The plug-type connectors thereby serve to fix the housing parts in one plane and the locking bolt serves to fix them perpendicular to same.

SUMMARY OF THE INVENTION

The object of the invention is to develop a gear housing for a spindle or worm drive for adjusting devices in motor vehicles which is cost-effective to manufacture and simple to fit. The gear housing should be small and compact and thus enable installation within the rails while at the same time it has to be ensured that in the event of the gear becoming blocked the vehicle seat can still be moved into a position which enables it to be dismantled.

This is achieved in that the gear elements are mounted in a gear housing which consists of at least two housing plates which are fixed against each other through plug-type connectors wherein the plug-type connectors serve at the same time as supporting connecting joints which absorb the gear forces and to this end are designed correspondingly rigid. In one embodiment, a gear element formed as a threaded spindle is held in at least one holder preferably by at least one ideal break point, and at least one end of the threaded spindle is formed as a positive locking element which can be connected to a rotating tool in order to overcome the ideal break point for the purposes of emergency activation.

The advantage of the invention is that the size of the gear can be reduced significantly compared to similar gears since the plug-type connectors serving to fix the individual housing parts are at the same time also suitable for taking up the gear forces. Thus the use of the gear according to the invention is also possible for motor vehicle seats where the actual seat is mounted on very narrow rails, and/or the possibility becomes available of changing over to narrow rail guides.

In a preferred embodiment of the invention it is proposed to fix the position of the housing plates in relation to each other in all three-dimensional directions through the plug-type connectors. This fixing of the housing plates can be produced for example by staking the material in the area of the plug-type connectors, by laser welding or by casting the plug-type connectors and by sticking the connectors. Further features of the invention relate to a process for assembling the gear housing.

Furthermore it is advantageous if the housing plates are fixed against each other solely at the said plug-type connectors. This produces with the minimum of expense a supporting connection between the individual housing parts; it is not necessary to provide separate fastening means on one side and supporting areas on the other side which serve to absorb the gear forces.

The production of the gear is also possible using a small number of parts. Manufacturing costs are reduced since the housing parts and the tools can be manufactured cost-effectively. After assembling the housing it is not necessary to finish off the housing plates.

The possibilities for use of the gear are wide. Particularly because of its size and low weight it can be used for drives where the use of such gears was hitherto not possible.

BRIEF DESCRIPTION OF THE DRAWINGS

The invention will now be explained in further detail with reference to the embodiments shown in the drawings in which:

FIG. 8 shows an L-shaped housing plate;

FIG. 9 shows a U-shaped housing plate in connection with a disc-like housing plate;

DETAILED DESCRIPTION OF THE INVENTION

Figure 1:
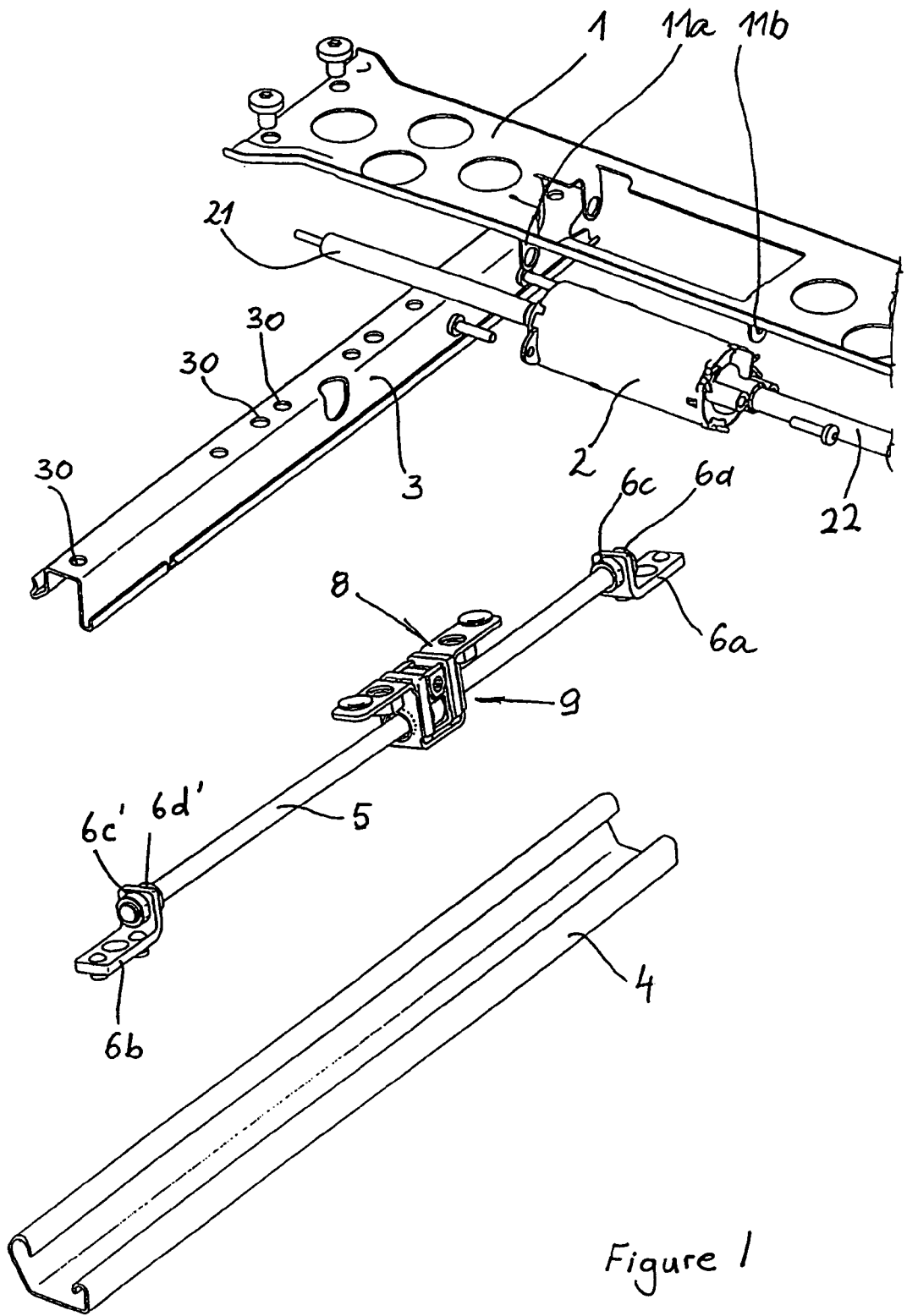
FIG. 1 shows a perspective illustration of a spindle drive (showing one side of the bearing of the vehicle seat)

As can be seen from FIG. 1 a holding plate 1 is associated with a top rail 3. The holding plate 1 is provided with fastening brackets 11a, 11b for the drive motor 2 so that the drive motor 2 is fixedly connected with the holding plate 1 and thus fixed to the top rail 3.

The upper frame of the vehicle seat (not shown in further detail here) is fixed on the top rail 3.

Drive shafts 21 and 22 are mounted either side on the drive motor 2. Flexible shafts are preferably used here. These drive shafts 21, 22 produce the connection with a gear 9, the position, construction and functioning of which will be described in detail further on.

The top rail 3 slides directly or through displacement and/or bearing elements (not shown) on a bottom rail 4 which is fixed on the vehicle floor.

In the functioning position of the top rail 3 and bottom rail 4 these rails are held by their contact and/or bearing areas so that a hollow cavity 31 is produced. A threaded spindle 5 is mounted inside this hollow cavity 31 where it is set between holders 6a and 6b which are mounted fixed on the bottom rail 4. The connection between the holders 6a, 6b is produced through fastening nuts 6c, 6d, 6c', 6d'.

Figure 2:
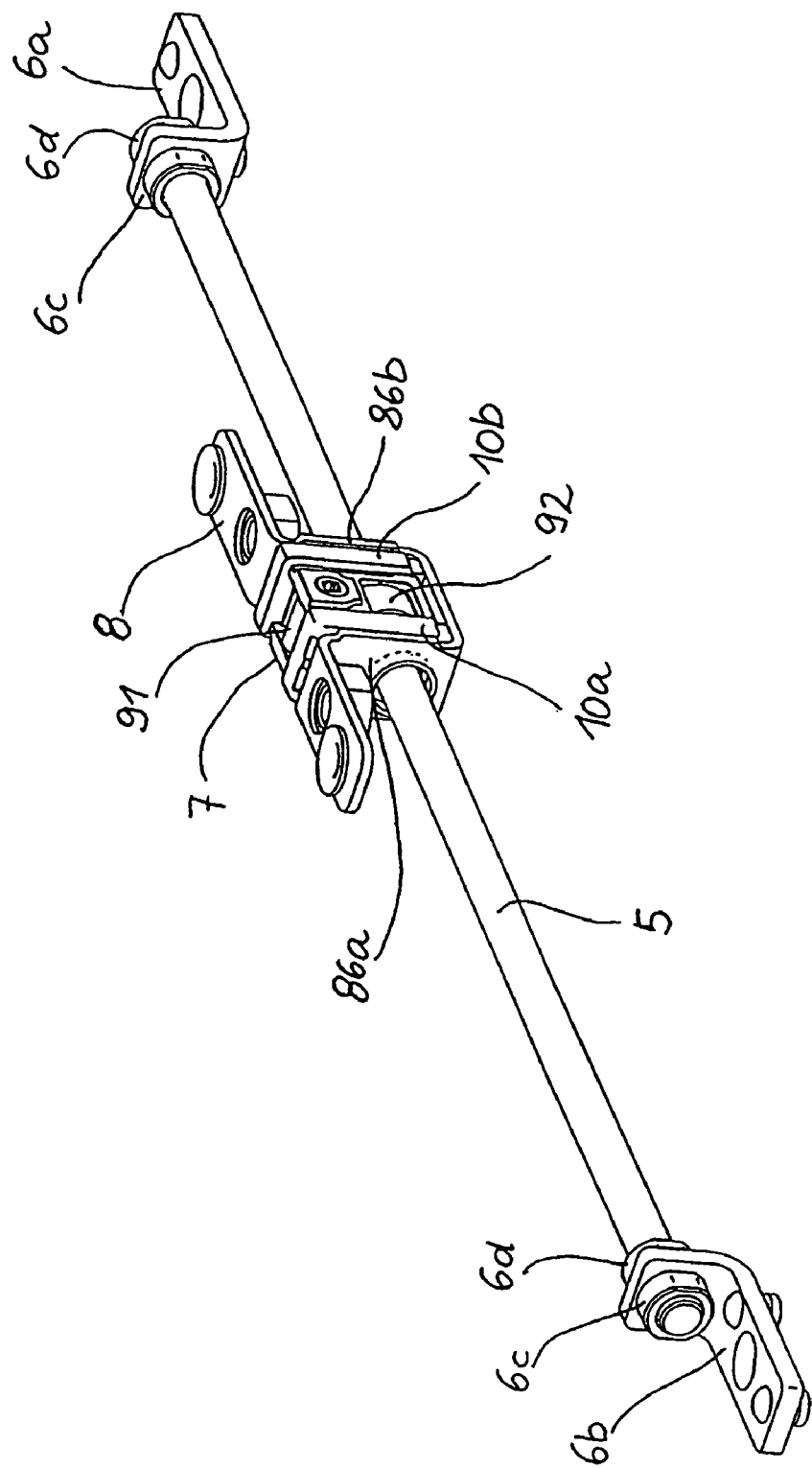
FIG. 2 shows a threaded spindle with gear including holder.

The threaded spindle 5 interacts with the gear 9 which is likewise mounted in the hollow cavity 31 and positioned locally fixed in the top rail 3. This arrangement is shown in FIG. 2. The gear 9 is held in a U-shaped holder 8 which is fixedly connected to the top rail 3 (not shown here). Uncoupling elements 10a, 10b are inserted between the arms 86a, 86b of the holder 8 and the gear 9 in order to eliminate any noises and compensate for tolerances.

Figure 3:
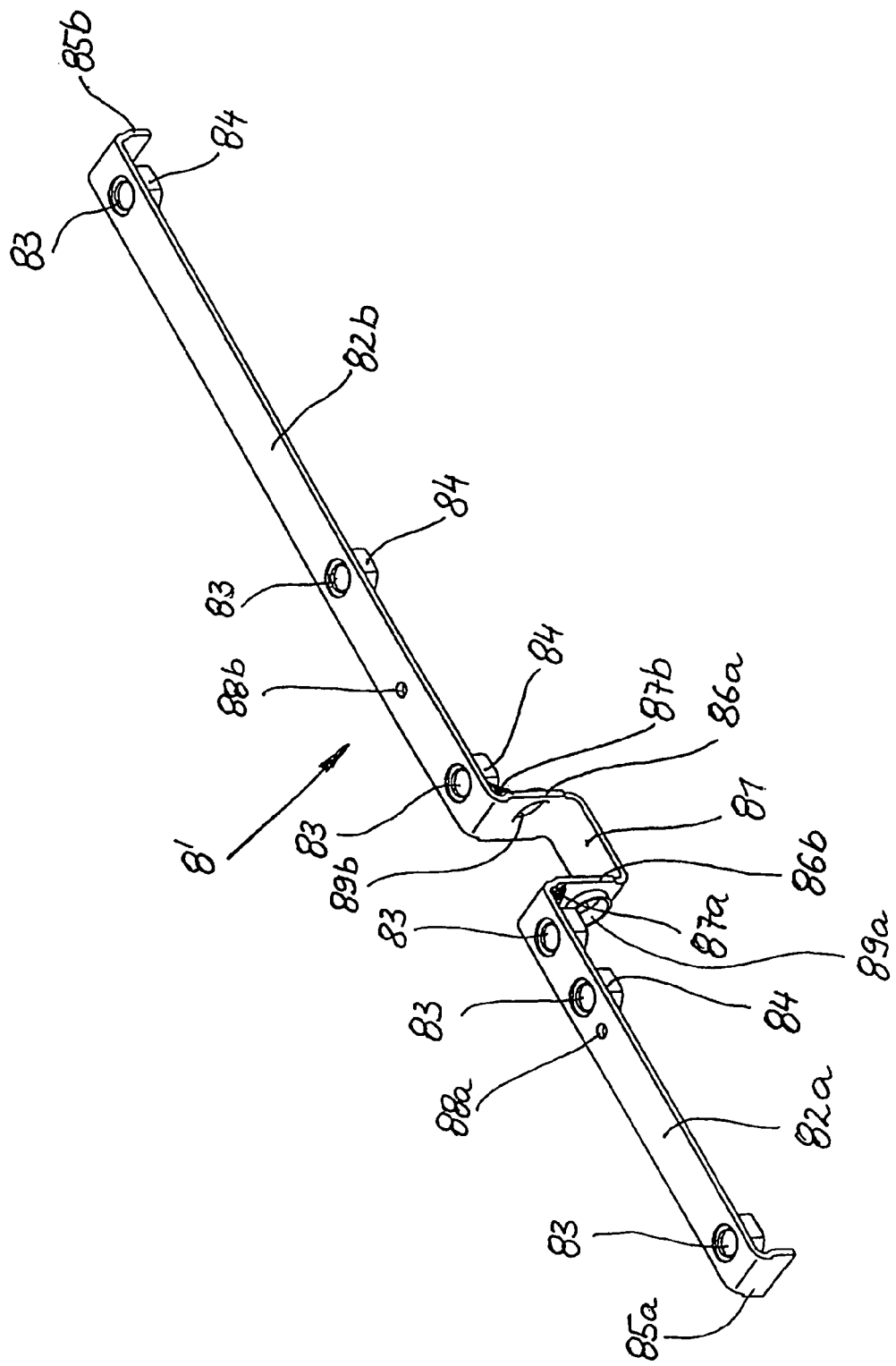
FIG. 3 shows a holder for a gear.

In a further design of the bearing of the gear 9 it is provided in the top rail 3 through an extended holder 8'. This holder is shown in FIG. 3. The gear 9 (not shown here) is mounted similar to the manner shown in FIG. 2 in the gear mounting part 81 of the holder 8'. The arms 82a; 82b of the holder 8' are fixed on the top rail 3. In this embodiment these are screwed to the top rail 3. For this reason the arms 82a; 82b have fastening openings 83 which correspond to the fastening openings 30 in the top rail 3 shown in FIG. 1. The fastening openings 83 are associated with welded nuts 84, that is the welded nuts 84 are welded onto the openings. The welded nuts 84 thereby point in the direction of the hollow cavity 31. Instead of the welded nuts 84 it is also possible to use unit nuts or stamped nuts. Another possibility is to create passages instead of using nuts, and to provide these with an internal thread. It is also possible to use combinations of the designs described above. Connecting or screwing the holder 8' to the top rail 3 improves its rigidity. Through the arrangement of the welded nuts 84 or passages mentioned above it is possible to assemble the gear 9 complete with its holder 8' in advance and then to slide this unit into the hollow cavity 31 of the rail guide 3; 4 which is already fitted. The top rail 3 can then be screwed to the holder 8' through the fastening openings 83.

The holders 8, 8' have in a further embodiment ideal deformation areas 87a; 87b which are arranged between the arms 86a; 86b of the gear holder 81 and the arms 82a; 82b of the holder 8'. These ideal deformation areas 87a; 87b can in the simplest design be correspondingly dimensioned welded seams. It is however also possible to use as ideal deformation areas 87a; 87b angles or other profiles at this point. All these elements are dimensioned so that they only yield when a predetermined ideal strain is applied and only then is the arm 86a; 86b or the gear socket 81 deformed. This then happens so that when a predetermined maximum boundary strain is exceeded the arms 86a; 86b swivel sideways and thereby clamp the threaded spindle 5. In the event of a crash this helps to provide additional security for the vehicle seat.

The two arms 82a, 82b of the holder 8' are angled and have in the angled areas 85a, 85b a wider material which substantially fills out the hollow cavity 31. The rigidity of the rail guide, i.e. its resistance to bending, can thereby be improved. The hooked engagement between the top rail 3 and bottom rail 4 remains secure.

Bores 88a, 88b provided in the arms 82a, 82b serve to centre the holder 8' relative to the top rail 3, for example through blind rivets (not shown here). The passages 89a, 89b formed in the arms 86a, 86b increase the critical cross-section of the retaining angle 8' and help to safely transfer forces in the event of a crash.

Figure 4:
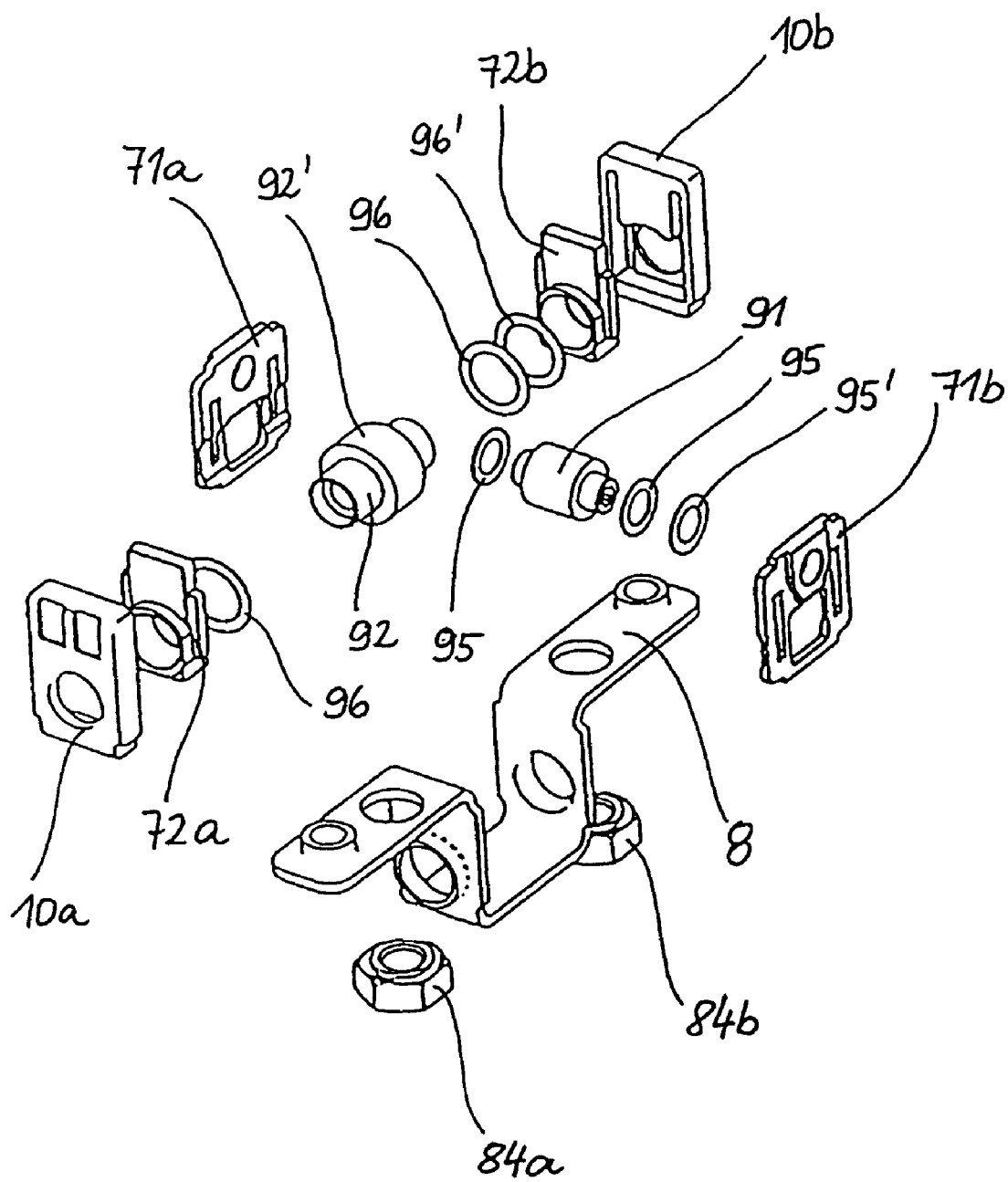
FIG. 4 shows an explosive view of the gear including holder.

As can be seen from FIG. 4, the gear 9 consists of a drive worm 91 which engages with a spindle nut 92 through the external worm gearing 92'. The drive worm 91 is connected to the drive motor 2 through the drive shaft 21, 22 (see here FIG. 1). The spindle nut 92 is associated with the threaded spindle 5 through its internal thread.

Regarding the method of operation of the device: If the drive motor 2 rotates then it transfers its movement through the drive shaft 21, 22 to the drive worm 91. This transfers its rotary movement to the spindle nut 92. Since the threaded spindle 5 is secured against rotation the gear 9 and thus the top rail 3 connected to same, and including the vehicle seat, has to execute a translation movement (see here FIG. 1).

Figure 5:
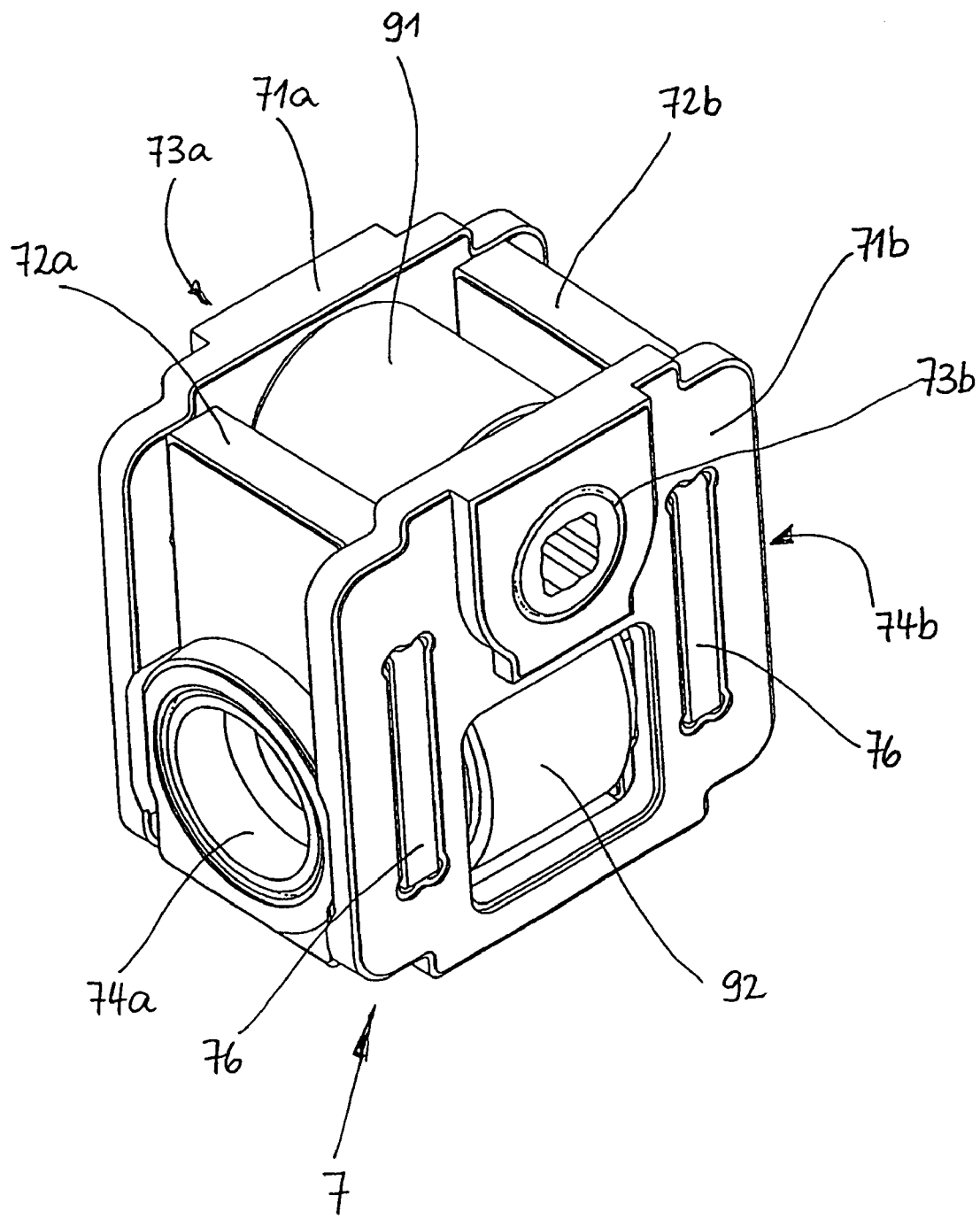
FIG. 5 shows the gear in the assembled state.

FIG. 4 shows an explosive view of the construction of the gear 9. It can be seen that the gear elements, consisting of a drive worm 91 and a spindle nut 92 are mounted in the housing plates 71a, 71b; 72a, 72b of a gear housing 7. FIG. 5 shows the gear 9 in the assembled state. It can be seen that the drive worm 91 is mounted in the housing plate 71a and 71b through bearing bores 73a and 73b whilst the spindle nut 92 is mounted in the bearing bores 74a and 74b of the housing plate 72a and 72b. Discs 95 and 96 are provided for the axial running of the spindle nut 92 and drive worm 91 whilst shaft discs 95', 96' serve to compensate for the axial play.

Figure 6:
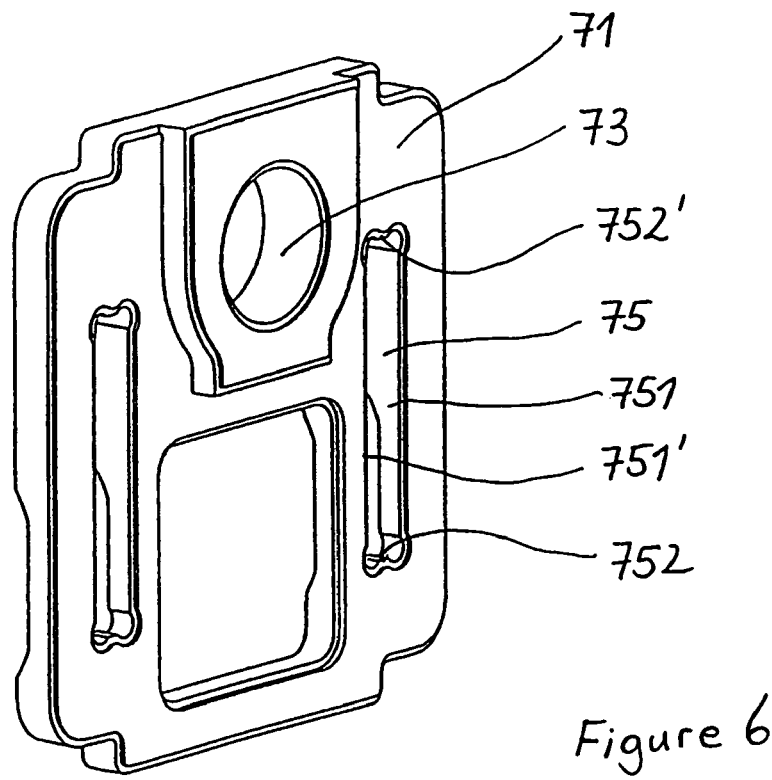
FIG. 6 shows a housing plate with bearing bore for the drive worm.
Figure 7:
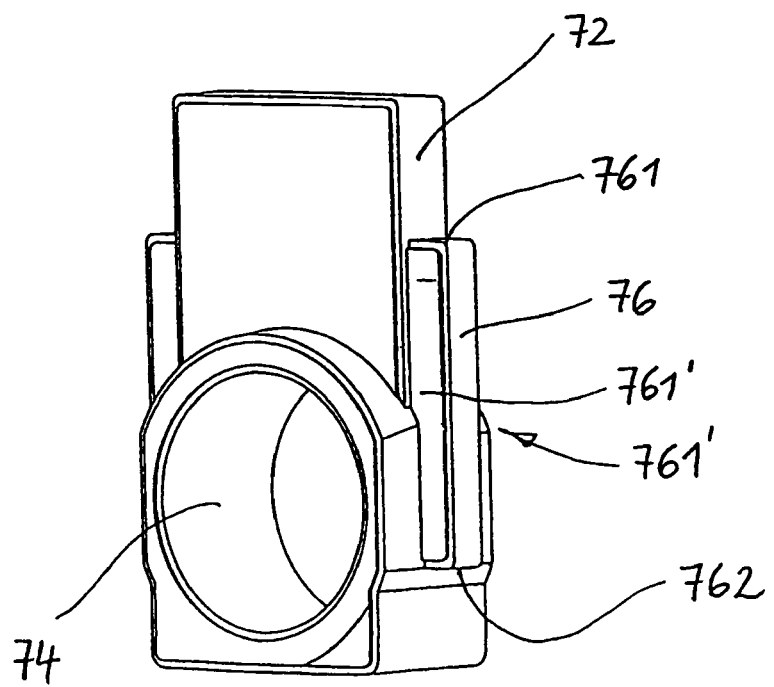
FIG. 7 shows a housing plate with bearing bore for spindle nut.

One possible construction of the gear housing 7 according to the invention can be seen from FIGS. 6, 7, 8 and 9. As can be seen from FIGS. 5 to 7 the gear housing here consists of two opposing disc-like housing plates 71*a*, 71*b*; 72*a*, 72*b* wherein the housing plates in the individual illustration according to FIGS. 6 and 7 are each provided with the reference numerals 71 and 72. The housing plates 71*a*; 71*b*; 72*a*; 72*b* are preferably made from a sintered material. They can however also be made from other materials, such as cast materials, steel or even plastics. The housing plates 71*a*; 71*b*; 72*a*; 72*b* are manufactured to their final dimensions. This also relates to the bearing bores 73*a*; 73*b*; 74*a*; 74*b*, their position in the housing plates 71*a*; 71*b*; 72*a*; 72*b* and also their tolerances.

The opposing housing plates 71*a*; 71*b* and 72*a*; 72*b* which belong together are identical in design. Thereby one pair, in the embodiment here the housing plates 72*a*; 72*b*, have areas formed as webs 76 which are arranged on the edges of the housing plates 72*a*; 72*b*, thus extend along the plane of the housing plates 72*a*; 72*b*. The opposite sides 761; 761' of the webs 76 are aligned either parallel, run conical or have scraper ribs.

Corresponding recesses 75 formed as full-length through openings are arranged in the edge areas of the housing plates 71*a*; 71*b* transversely to the plane of the housing plates 71*a*; 71*b*. These recesses 75 have surfaces 751; 751' parallel to the sides 761; 761' of the webs 76.

Other possible embodiments of the housing plates are shown in FIGS. 8 and 9. These are on the one hand two L-shaped housing plates 77*a*; 77*b*. These L-shaped housing plates 77*a*; 77*b* support on one of their arms webs 76' which correspond to the recesses 75' similar to the embodiment described above. The corresponding bearing bores 73' and 74' are as already described above, formed in the housing plates.

FIG. 9 shows a gear housing which consists of a U-shaped housing plate 78 and a disc-like housing plate 79 associated therewith. The arms of the U-shaped housing plate 78 likewise support webs 76'' which engage in corresponding recesses 75'' of the disc like housing plate 79.

For assembly the webs 76; 76', 76'' are pushed into the recesses 75, 75', 75''. The dimensions of the recesses 75; 75'; 75'' and webs 76' 76'; 76'' are matched with each other so that after the assembly process either play fitments or press-fit fitments can be formed. After assembly the position of the recesses 75 and of the webs 76 and thus the position of the drive worm 91 relative to the spindle nut 92 are fixed and finally secured by plastically deforming the material in the area of the plug-type connections.

The fitting of the gear housing 7 can be assisted or completely replaced by automatic sequences. This will now be explained below with reference to disc-like housing plates 71*a*; 71*b*; 72*a*; 72*b*. The assembly of the L-shaped housing plates 77 and U-shaped housing plates 78 and 79 is carried out in a similar way. To this end the gear elements (drive worm 91, spindle nut 92; discs 95, 96; shaft discs 95', 96') including the housing (housing plates 71, 72) are all pre-assembled. This means that the gear elements are inserted in the bearing bores provided for this purpose and the housing plates 71, 72 are pushed together.

This pre-assembled gear 9 is now inserted into a combined holding and staking device which holds the gear 9 around its outer contour. The holder is provided in the direction of the plane of the housing plates 72*a*; 72*b* wherein the holding forces which engage on the four corners of the housing plate 71*a* or 71*b* are kept relatively small.

The gear 9 is now moved, preferably by turning the drive worm 91. At least one revolution has to be made. The housing plates 71*a*; 71*b*; 72*a*; 72*b* can thus be aligned free of tension. After the completion of this movement the holding forces are intensified so that the gear elements 91, 92 and housing plates 71, 71*b*, 72*a*, 72*b* are held in this position and are prevented from slipping. A staking tool now engages in the area of the plug-type connections, that is into the contact points between the webs 76; 76' and 76'' and the recesses 75; 75' and 75'' and then deforms the material plastically at these points. The deformation is carried out so that the material forms undercut sections for example and thus finally fixes the position of the housing plates 71*a*; 71*b*; 72*a*; 72*b* relative to each other.

In order to prevent deformation of the bearing bores 74*a*; 74*b* of the spindle nut 92 the staking is not carried out over the entire length of the plug-type connections. Staking is only undertaken in the area where influence of the forces on the bearing area of the spindle nut 92 in the housing plate 72 and thus deformation of the bearing bores 74 can be eliminated.

Fixing the housing plates 71*a*, 71*b*, 72*a*, 72*b* can also be carried out by welding the material in the area of the plug-type connections through the use of laser technology. A further possibility lies in fixing the position of the housing plates 71, 72 relative to each other by casting the material in the area of the plug-type connections.

Another development of the process lies in turning the gear elements at a higher speed for the purpose of alignment. It is expedient to work with the nominal speed or with a speed of the gear which is faster than this. The gyrating forces which are thereby produced keep the position of the gear elements 91, 92 stable relative to each other during movement so that the position is fixed during movement.

The bearing of the threaded spindle 5 can also be designed so that the holders 6*a*, 6*b* (see FIG. 2) of the threaded spindle 5 are associated with vibration-damping sleeves (not shown here) or similar structural elements.

Obviously the construction of the plug-type connectors is not restricted to the variations illustrated in FIGS. 5 to 9. Thus the plug-type connectors can be formed by pins or bolts which are provided on one of the housing parts which are to be connected and which engage in a corresponding recess of the other part, or through a tongued and grooved connection wherein to produce the positive engagement or an all round force-locking engagement a dovetailed groove or T-shaped groove is particularly suitable, although a U-shaped groove or similar could also be included. Furthermore a number of positive-locking slit connections is also possible.

One design of the invention consists in providing the bearing of the threaded spindle 5 with an emergency actuation. This is required to allow the threaded spindle 5 to be unturned in the event of a defect in the gear 9. The vehicle seat can thereby also be moved in this case which is necessary if it is to be dismantled since the screw connection between the holder 6*a*; 6*b* and the bottom rail 4 can be concealed by the top rail 3. If it is necessary to undo the screw connection then the top rail 3 has to be moved relative to the bottom rail 4. For this it is proposed to provide the bearing of the threaded spindle on at least one holder 6*a*, 6*b* with an ideal break point and to provide the threaded spindle 5 at least one end with a positive locking element 52 which can be seized and turned by a tool when needed. Such designs are shown in FIGS. 10 to 17.

Figure 10:
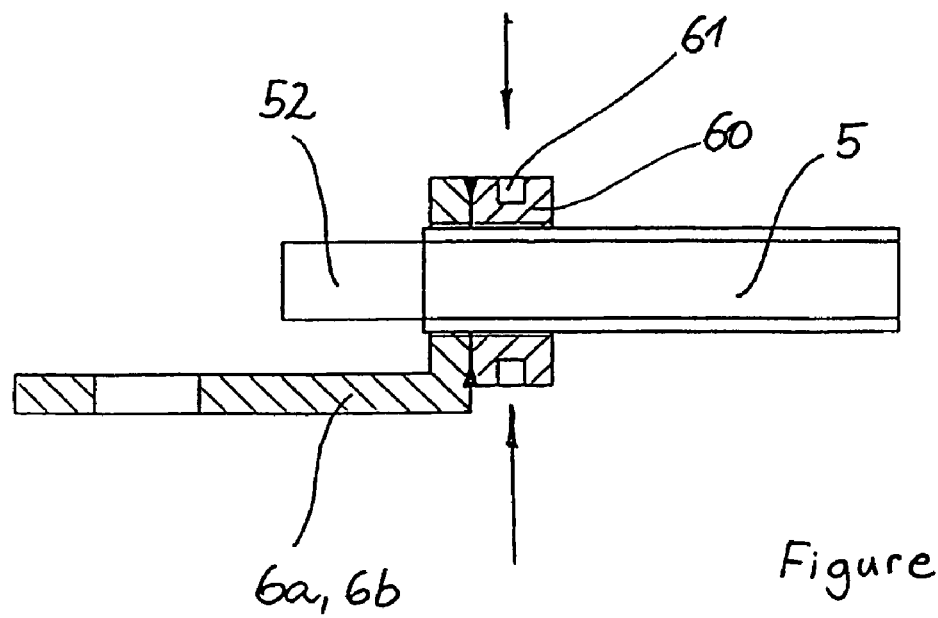
FIG. 10 shows the bearing of the threaded spindle with compressible threaded element as anti-rotation lock and for emergency operation.

FIG. 10 shows a design where for example a threaded element 60 is used which has on its circumference a weakened material area as a circumferential groove 61. However other types of weakened material areas are also possible, such as for example notches or the like. The threaded element 60 is welded to one of the holders 6a, 6b. In order to form an ideal break point the material is squashed with the threaded spindle 5 in the area of the groove 61. This takes place at two opposite points of engagement (see arrows) whereby it is also possible to squash the material on one side only. In the event of an emergency operation threaded spindle 5 is turned and the retaining force of the compressed material is overcome.

Welded, stamped or sheet metal nuts can be used as threaded elements 60, producing material or force-locking connections with the material.

Figure 11:
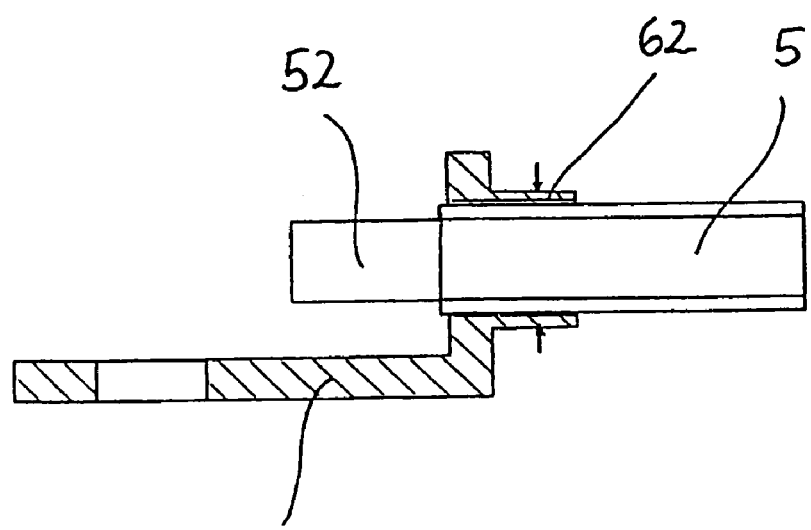
FIG. 11 shows the bearing of the threaded spindle with compressible passage.

A simple variation is shown in FIG. 11. Here instead of a threaded element 60 a passage 62 is produced in the holder 6a, 6b and is provided with a thread to hold the threaded spindle 5. The passage 62 is compressed with the threaded spindle 5 (see arrows).

Figure 12:
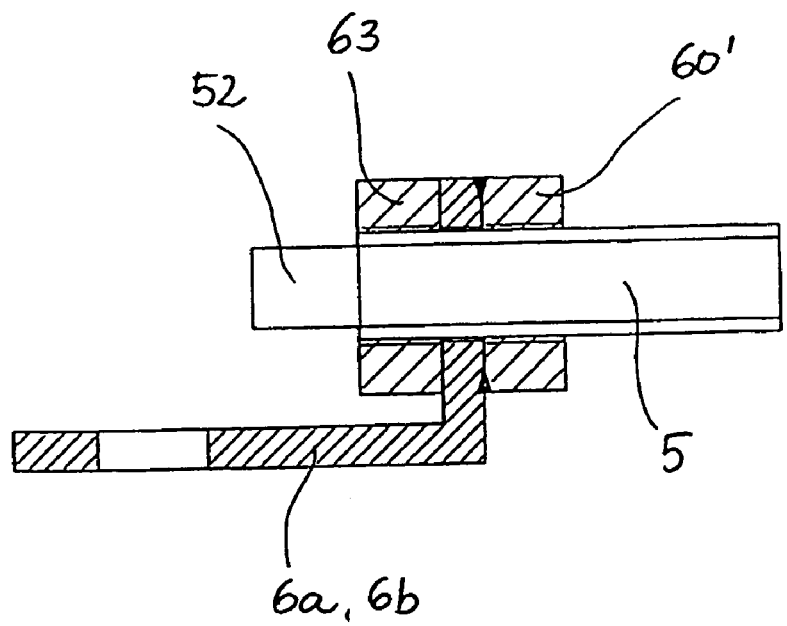
FIG. 12 shows the bearing of the threaded spindle with a threaded element tensioned through a counter nut as the anti-rotation lock.

FIG. 12 shows a solution wherein a threaded element 60' is welded to the holder 6a, 6b, similar to the variation illustrated in FIG. 10. This threaded element 60' is tensioned by a counter nut 63. In the event of an emergency operation, the counter nut 63 can be loosened and thus the threaded spindle 5 can be turned.

Figure 13:
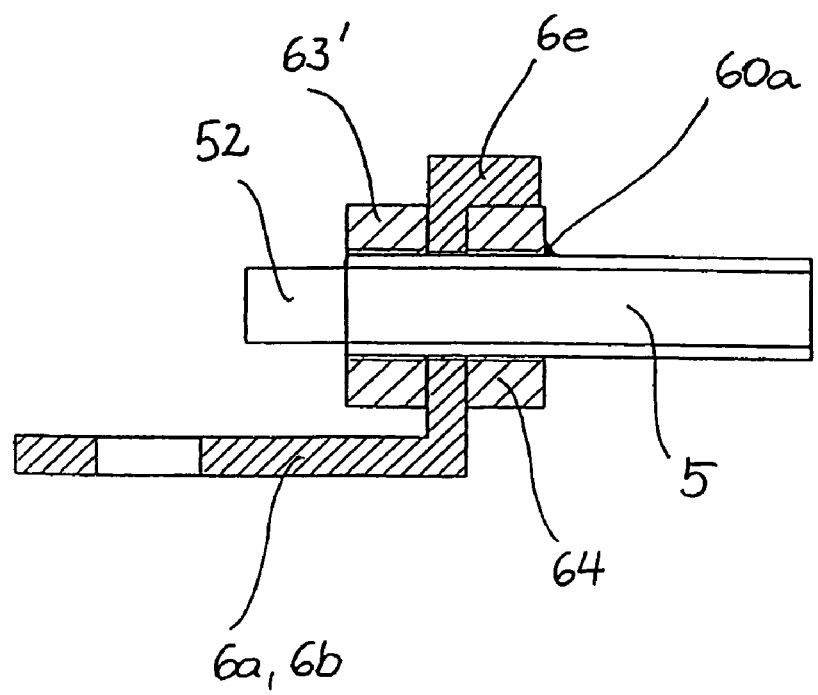
FIG. 13 shows the bearing of the threaded spindle with a position-fixed nut which is tensioned on the threaded spindle through a counter nut.

FIG. 13 shows a similar solution. A nut 64 is however here not welded to the holder 6a, 6b but is held in keyed connection through a stop 6e which is attached to the holder 6a, 6b. The tension is likewise produced through a counter nut 63. As an ideal break point a welded point 60a is provided here between the nut 64 and the threaded spindle 5.

Figure 14:
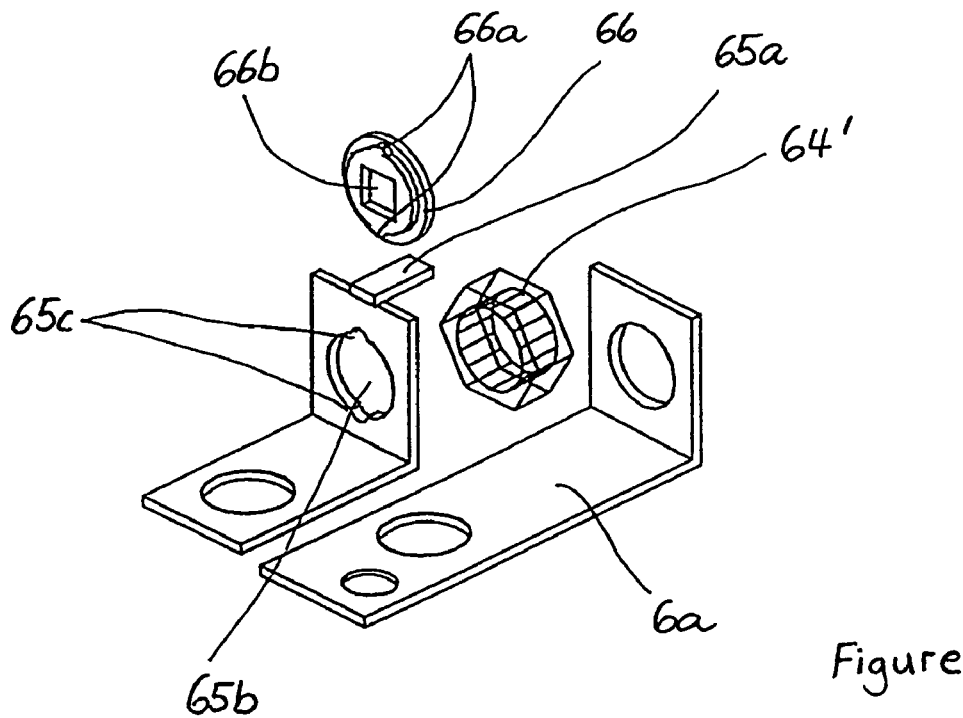
FIG. 14 shows the bearing of the threaded spindle with an anti-rotation lock of plastics.
Figure 15:
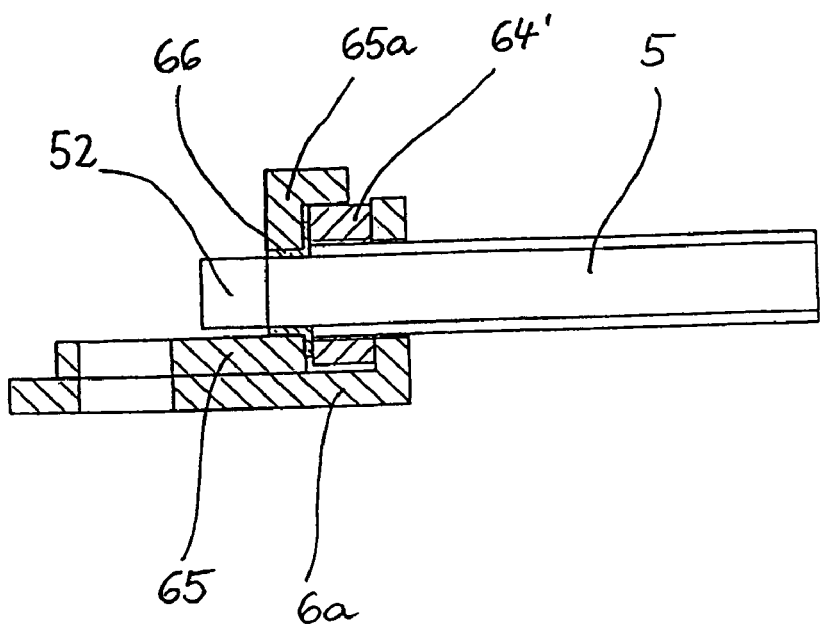
FIG. 15 shows a sectional view of FIG. 14.

FIGS. 14 and 15 show a solution in which a security plate 65 is provided, having a bracket 65a which secures a nut 64' in its position arranged between the holder 6a and the security plate 65. As an ideal break point an anti-rotation lock 66, preferably made of plastics, is provided here. This is inserted with its outer contour in keyed connection in a threaded spindle receiving bore 65b of the security plate 65. The keyed connection is here produced through at least one positive locking element 66a moulded on the circumference of the anti-rotation lock 66 and corresponding to a matching recess 65c in the threaded spindle receiving bore 65b. The anti-rotation lock 66a is connected rotationally secured to the threaded spindle 5 in that a square edge or other geometrically designed element at the end of the threaded spindle 5 engages in a corresponding internal contour 66b of the anti-rotation lock.

In the event of emergency operation the threaded spindle 5 including the anti-rotation lock 66 is turned which leads to the destruction of the anti-rotation lock 66. The threaded spindle 5 can thereby be moved.

Figure 16:
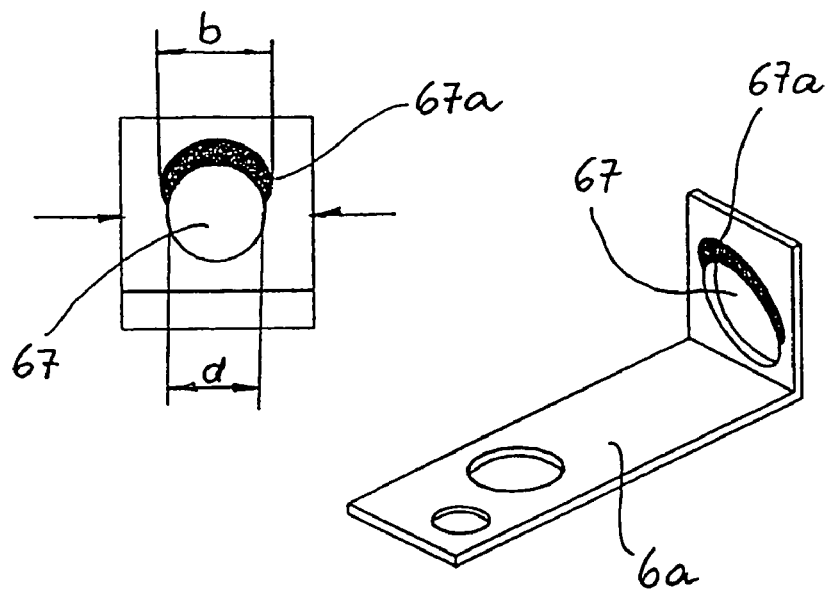
FIG. 16 shows an anti-rotation lock of the threaded spindle with a plastics lock.

FIG. 16 shows a different possibility of using the anti-rotation locking element of plastics. Here a plastics security member 67a is formed in a threaded spindle receiving opening of two holders 6a, 6b so that the circular round cross-section of the receiving opening 67 remains, whilst the width b of the plastics security member is however larger than the diameter d of the receiving opening 67. The compression and thus design of the ideal break point is through forces in the direction of the arrows. The possibility is thereby provided of the threaded spindle 5 transferring both tensile and compression forces whilst also being secured against rotation.

In the event of emergency operation the plastics security member 67a is forced out so that the threaded spindle 5 can escape into the space which becomes available or, if necessary, can be forced into this space by means of a tool (not shown here). Thus the threaded spindle 5 becomes free and the vehicle seat can be removed without the threaded spindle 5 having to turn.

Figure 17:
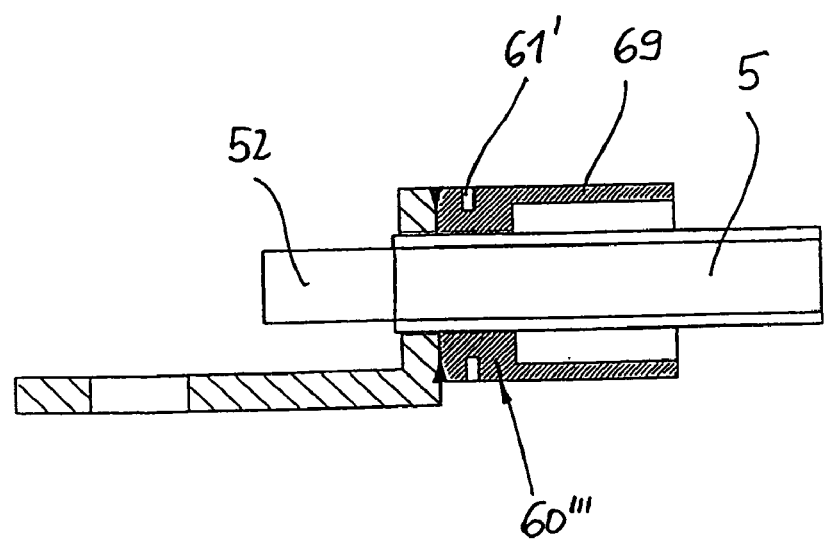
FIG. 17 shows the anti-rotation lock of the threaded spindle through a welded pinch nut with distance sleeve.

In FIG. 17 a special pinch nut 68 is shown which similar to the example described with reference to FIG. 10 is welded to a holder 6a, 6b and has a circumferential groove 61' as the weakened material area. The compression onto the threaded spindle 5 and the emergency operation take place similar to the example of FIG. 10. In this example however a distance sleeve 69 is mounted on the special pinch nut 68 on the side remote from the holders 6a, 6b and restricts the travel path of the top rail 3 on the bottom rail 4. A variable end stop can for example also be achieved through plastics clips (not shown here) which are fixed separately on the threaded spindle as the vehicle seat is fitted.

In order to be able to execute the emergency operation described above (with the exception of the example described in relation to FIG. 16) in order to turn the threaded spindle 5 its end has to be gripped by a tool. For this purpose the end of the threaded spindle 5 has to be provided with a suitably designed positive locking element 52. This can be achieved for example by flattening same on one or both sides or by providing an internal or external multi-edged shape, for example a square edge.

Figure 18:
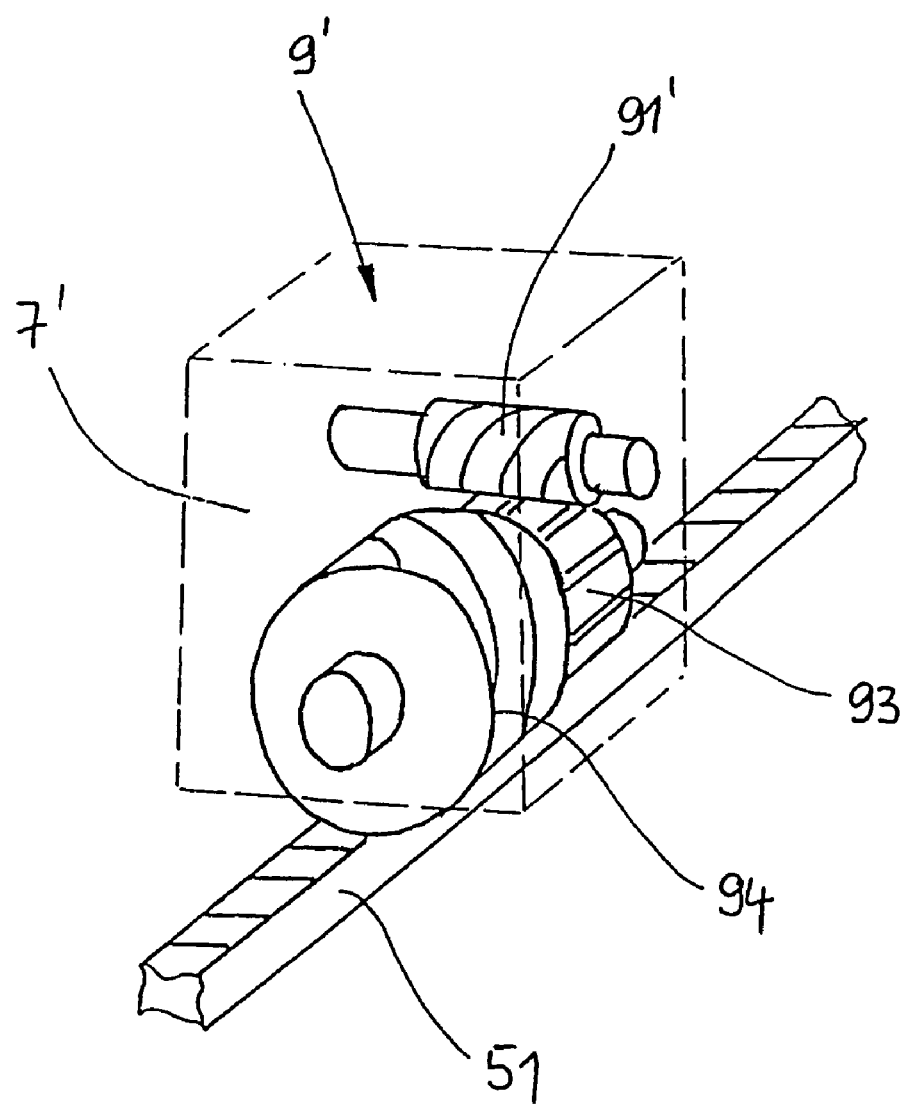
FIG. 18 shows the principle sketch of an adjusting drive with toothed rack.

The use of the gear according to the invention described above is not only restricted to the operation of a threaded spindle 5. The use of a toothed rack is likewise possible. FIG. 18 shows diagrammatically the arrangement of a device of this kind which is mounted inside the gear housing 7 according to the invention. The drive worm 91' thereby meshes with a worm wheel 93 which is connected axially fixed to the worm 94. The worm 94 engages with the teeth of a toothed rack 51.

Through the rotary movement of the drive motor (not shown here) a rotary movement is transferred to the drive worm 91'. This moves the worm wheel 93 and thus the worm 94 which leads to a relative movement between the toothed rack 51 and the gear. With this device it is likewise possible to operate a seat adjustment device or a window lifter or other adjustment devices in a motor vehicle.

Figure 19:
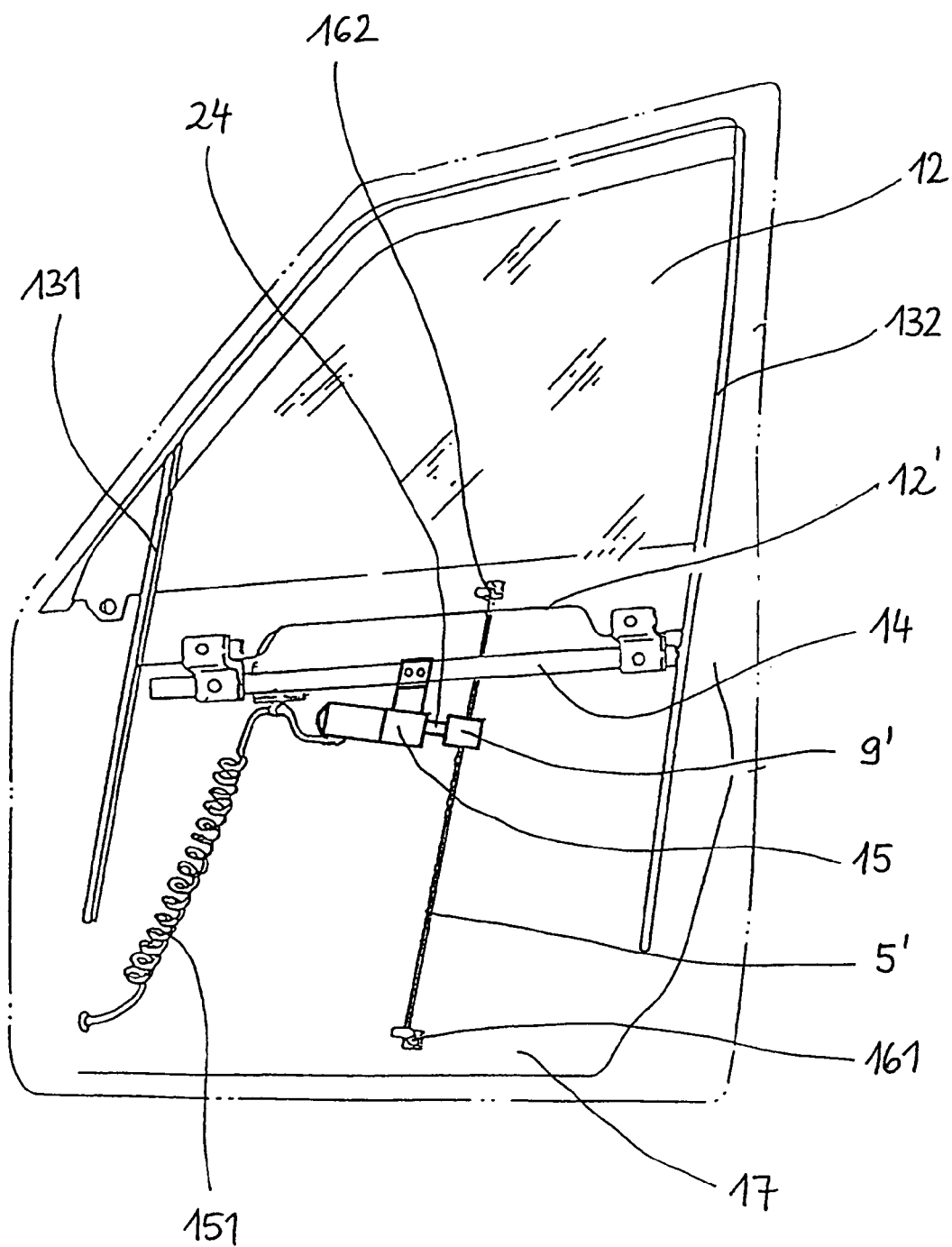
FIG. 19 shows a spindle drive for a window lifter.

FIG. 19 shows a principle sketch from which it is possible to see the use of the invention for driving a window lifter on a vehicle door. As can be seen from FIG. 19 a window pane 12 is held between two guide rails 131, 132 which are arranged one on each side of the vehicle door. A window lifter motor 15 is mounted on the lower edge 12' of the window pane 12 through a holding rail 14 and is supplied with power through a cable. The drive shaft 23 of the window lifter motor 15 is connected to the gear 9. The construction of the gear 9 was already described in closer detail with reference to FIG. 4. I.e. a drive worm (not shown here) is located inside the gear housing 7 and engages with that of a threaded spindle 5' through a spindle nut. The threaded spindle 5' is fixed rotationally secured on the inner door panel 15 through holding angles 161, 162. The axis of the threaded spindle 5' must thereby point in the direction of movement of the window pane 12.

If the window lifter motor 15 rotates then the spindle nut is turned through the drive worm (not shown here). Since the threaded spindle 5' is secured against rotation the fixed unit of gear 9, window lifter motor 15 and window pane 12 must move along the axis of the threaded spindle 5'. The window pane 12 is thereby guided in the guide rails 131, 132.

The use of the invention is not restricted to the examples described above for operating the longitudinal seat adjustment and window lifter drive. It is furthermore possible to use the invention for spindle or worm drives for adjusting the seat height, seat incline, seat cushion depth, seat back and or head restraint.

What is claimed is:

1. A method for assembling a gear housing for a drive comprising:
    a) assembling gear elements and housing plates together by fitting the housing plates together with plug connectors about the gear elements, said plug connectors forming supporting connection joints that absorb gear forces;
    b) inserting the gear elements and the housing plates into a holding device which holds the housing plates with sufficiently light holding forces so that the housing plates can be aligned when the gear elements are turned,
    c) turning the gear elements to align bearing points of the gear elements which are provided on the housing plates; and
    d) securing the position of the gear elements and the housing plates relative to each other by increasing the holding forces and permanently fixing the position of the housing plates in all three dimensional directions through action on the plug connectors.

2. The method for assembling a gear housing according to claim 1, wherein the gear elements are turned from a first position about at least 360° to a second position and are held in the second position during the step of securing the position of the gear elements and the housing plates.

3. The method for assembling a gear housing according to claim 1, wherein during the step of securing the position of the gear elements and the housing plates, the gear elements are driven at a speed which is above a nominal speed of the gear elements.

4. The method for assembling a gear housing according to claim 1, wherein the step of securing the position of the gear elements and the housing plates is performed by a staking device engaging the plug connectors away from said bearing points of the gear elements.

5. The method for assembling a gear housing according to claim 1, wherein the step of securing the position of the gear elements and the housing plates is performed by laser welding the plug connectors.

6. The method for assembling a gear housing according to claim 1, wherein the steps of holding the holding plates, turning the gear elements and securing the position of the gear elements and the housing plates are carried out in said holding device.

* * * * *